US008059137B2

(12) United States Patent
Hanggie et al.

(10) Patent No.: US 8,059,137 B2
(45) Date of Patent: Nov. 15, 2011

(54) COMPOSITING DESKTOP WINDOW MANAGER

(75) Inventors: Scott Hanggie, Redmond, WA (US); Victor Tan, Kirkland, WA (US); Gerardo Bermudez, Redmond, WA (US); Gregory D. Swedberg, Bellevue, WA (US); Mark Richard Ligameri, Snohomish, WA (US); Greg Scott Melander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/940,514

(22) Filed: Nov. 5, 2010

(65) Prior Publication Data

US 2011/0072391 A1    Mar. 24, 2011

Related U.S. Application Data

(62) Division of application No. 10/691,450, filed on Oct. 23, 2003, now Pat. No. 7,839,419.

(51) Int. Cl.
*G09G 5/00* (2006.01)

(52) U.S. Cl. ........ 345/619; 345/581; 345/592; 345/522; 345/501

(58) Field of Classification Search ........................ None
See application file for complete search history.

(56) References Cited

U.S. PATENT DOCUMENTS

| 4,694,404 | A | * | 9/1987 | Meagher ...................... 345/421 |
| 4,916,540 | A | | 4/1990 | Etsuko |
| 5,113,213 | A | | 5/1992 | Sandor |
| 5,303,370 | A | | 4/1994 | Brosh |
| 5,307,449 | A | * | 4/1994 | Kelley et al. .................. 345/419 |
| 5,396,559 | A | | 3/1995 | McGrew |
| 5,438,429 | A | | 8/1995 | Haeberl |
| 5,487,145 | A | | 1/1996 | Marsh et al. |
| 5,537,548 | A | | 7/1996 | Fin et al. |
| 5,819,271 | A | | 10/1998 | Mahoney |
| 5,862,325 | A | | 1/1999 | Reed |

(Continued)

FOREIGN PATENT DOCUMENTS

GB        2312119        10/1997

(Continued)

OTHER PUBLICATIONS

Author: David Morgenstern, Title: Under the desktop: Prospecting for Quartz in Mac OS X; http://www.creativepro.com/story/feature/17439.html?origin=story; Aug. 22, 2002; pp. 1-4.*
Author: Moki, Title: Aqua help in Nvidia GeForce 4 [Archive]—AppleInsider; http://forums.appleinsider.com/archive/index.php/t-1122.html; Jan. 28, 2002; p. 1.*

(Continued)

*Primary Examiner* — Kee M Tung
*Assistant Examiner* — Jwalant Amin
(74) *Attorney, Agent, or Firm* — Shook, Hardy & Bacon LLP

(57) ABSTRACT

A method and system for rendering a desktop on a computer using a composited desktop model operating system are disclosed. A composited desktop window manager, upon receiving content information from application programs, draws the window to a buffer memory for future reference, and takes advantage of advanced graphics hardware and visual effects to render windows based on content on which they are drawn. The windows may also be rendered based on environment variables including virtual light sources. The frame portion of each window may be generated by pixel shading a bitmap having the appearance of frosted glass based on the content of the desktop on top of which the frame is displayed. Legacy support is provided so that the operating system can draw and render windows generated by legacy applications to look consistent with non-legacy application windows.

14 Claims, 8 Drawing Sheets

U.S. PATENT DOCUMENTS

| | | | |
|---|---|---|---|
| 5,870,088 A | 2/1999 | Washington | |
| 5,940,843 A | 8/1999 | Zucknovich | |
| 5,986,652 A | 11/1999 | Medl | |
| 6,023,724 A | 2/2000 | Bhatia | |
| 6,026,433 A | 2/2000 | D'Aralach | |
| 6,061,695 A | 5/2000 | Slivka et al. | |
| 6,076,120 A | 6/2000 | Hatayama | |
| 6,208,347 B1 | 3/2001 | Migdal | |
| 6,466,239 B2 | 10/2002 | Ishikawa | |
| 6,486,886 B1 | 11/2002 | Silverbrook et al. | |
| 6,870,546 B1 | 3/2005 | Arsenault | |
| 6,980,209 B1* | 12/2005 | Donham et al. | 345/426 |
| 7,523,415 B1 | 4/2009 | Porter | |
| 2002/0112090 A1 | 8/2002 | Bennett et al. | |
| 2002/0180741 A1* | 12/2002 | Fowler et al. | 345/520 |
| 2002/0181741 A1 | 12/2002 | Masukura et al. | |
| 2002/0191027 A1 | 12/2002 | Morrow | |
| 2003/0107570 A1* | 6/2003 | Solazzi | 345/420 |
| 2003/0189599 A1 | 10/2003 | Ben-Shachar et al. | |
| 2004/0004613 A1* | 1/2004 | Adler | 345/419 |
| 2004/0030997 A1* | 2/2004 | Farrah | 715/530 |
| 2004/0075670 A1 | 4/2004 | Bezine et al. | |
| 2005/0071804 A1 | 3/2005 | Miserocchi | |
| 2005/0275661 A1 | 12/2005 | Cihula et al. | |

FOREIGN PATENT DOCUMENTS

| | | |
|---|---|---|
| JP | 11194818 | 7/1999 |
| TW | 487879 | 5/2002 |
| WO | 9728623 | 1/1997 |
| WO | 9720298 | 6/1997 |
| WO | 0161466 | 8/2001 |
| WO | 0210898 | 2/2002 |
| WO | 03042967 | 5/2003 |
| WO | 2005045736 | 5/2005 |

OTHER PUBLICATIONS

Author: John Siracusa, Title: Mac OS X 10.2 Jaguar; http://arstechnica.com/reviews/os/macosx-10.2.ars/8; Sep. 5, 2002; pp. 1-5.*

Author: Shawn Erickson, Title: Screenshot PDF; http://www.omnigroup.com/mailman/archive/macosx-talk/2002-July/071171.html; Jul. 30, 2002, p. 1-6.*

Author: Torrey Lyons, Title: Re: MacOS X; http://www.xfree86.org/pipermail/forum/2003-July/OO3741.html; Jul. 9, 2003; p. 1-3.*

Apple Computers, "About the Mac OS X Printing System"; Dec. 11, 2002, pp. 41.*

Lipton, "QuickDraw GX for Postscript programmers", http://www.mactech.com/articles/develop/issue_I 5/051-070_Lipton_final.html, Aug. 19, 2000, pp. 17.*

Portuesi et al., "Displaying In-Memory Video Using OpenGL", http://www.lurkertech.com/Ig/ogl.video.html, Oct. 16, 2002, pp. 5.*

Unreal Wiki, "Making Windows", http://web.archive.org/web/20030625003118/http://wiki.beyondunreal.com/wiki/Making_Windows, Jun. 25, 2003, p. 1-4.*

Notice of Allowance in Japanese Application No. 2006-536548 mailed Aug. 9, 2011.

Apple—Mac OS X—Features—Expose, printed from http://www.apple.com/macosx/features/expose/ on Nov. 2, 2004, 2 pages.

"Author: Apple, Title: Apple introduces ""Jaguar"": the Next Major Release of Mac OS X;http://www.apple.com/pr/library/2002/jul/17jaguar.html; Jul. 17, 2002; pp. 1-3."

John Siracusa, Title: Mac OS X 10.2 Jaguar; http://arstechnica.com/reviews/os/macosx-IO.2.ars/8; Sep. 5, 2002; pp. 1-5.

"Mike Whitman, Technology Terminology, May 13, 2001, pp. 1-39,http://web.archive.org/web/20010513215002/http://bigelowmiddleschool.com/programs/Teched/techterms.html."

B.P. Simonov, Decision on Grant, A Patent for Invention, App No. 2005120233, Dec. 9, 2008. Federal Service on Industrial Property, Patents and Trade Marks. Moscow, Russia, 19 pp.

"Compositing from off-screen windows with transparency, printed fromhttp://www.omniarou~.com/mailman/archive/macosx-dev2001-October/020023o.nht Sep. 30, 2003, 1 page".

"D. Berman, et al., ""Multiresolution Painting and Compositing"", Department of Computer Science and Engineering, 5 pages".

"D. Zongker, et al., ""Environment Matting and Compositing"", University of Washington, pp. 205-214pages".

"Daryll Strauss, Linux Helps Bring Titanic to Life, printed from http://delivery.acm.orgl1O.1 145/330000/327246/a6-~trau~~.html?key1=327246&key2=5.4 o7n. Oct. 2, 2003,6 pages".

Detailed View, Products & Services, printed from http://www.sun.com/jsp_utils/ScreenShotPopup.jsp?title=Rotate%20Window&base=/software/products/p... printed on Feb. 23, 2005, 5 pages.

Introducing HIView: Enabling Compositing in Windows, printed from http://developer.apple.com/documentation/Carbon/Conceptual/HIViewDoc/HIView_tasks/chapter_2_sect on Sep. 30, 2003, 1 page.

"Keith Packard, Translucent Windows in X , printed fromhttp://keithp.com/-keith/talks/KeithPackardAls2OOO on Sep. 30, 2003, 7 pages".

Lastrange, Tom. "An Overview of twm (Tom's Window Manager)", Solboume Computer Inc., 1989, Longmont, CO, 10 pp.

"Lindberg,""2D Graphics Using Quartz"",http://oops.se/cgi-bin/wiki?action=browse&diff=1&id=WwdcRapport2001/TwoDGraphicsUsingQuartz, May 22, 2001, 2 pp."

"Mirosoft's Longhorn 3D UI-More Info Emerges, printed from http://www.extremetech.com/Sep. 30, 2003, 22 pp."

"Nicholas Roussel, "Ametista: a mini-toolkit for exploring new window management techniques", Laboratoire de Rechereche en Informatique (LRI) & INRIA Futurs, Aug. 2003, pp. 117-124".

"Peter Graffagnino, ""Apple OpenGL and Quartz Extreme and demos"", Siggraph 2002 OpenGL .BOF/Anniversary Celebration Talks, printed from http://www.opengl.org/developers/code/features/siggraph2002_bof/ on Sep. 30, 2003, 27 pages".

Project Looking Glass by Sun Microsystems, printed from http://www.sun.com/software/looking_glass on Nov. 8, 2004, 9 pages.

Search Report, PCT/US04/18940, dated May 17, 2006, 7 pp.

Stardock: Object Desktop—Windowfx, printed from http://www.stardock.com/products/windowfx/ on Sep. 30, 2003, 10 pages.

The Omni Group, printed from http://www.omnigroup.com/ on Sep. 30, 2003, 1 page.

The Register, printed from http://www.theregister.co.uk/content/39/27346.html on Sep. 30, 2003.

"Policy for Proportional Resizing of Multi-Paned Windows in a Graphical User Interface", Jun. 1, 2000, Research Disclosure, Mason Publications, Hampshire, GB, p. 1104 XP000980814, ISSN: 0374-4353.

"Method for Resizing a Window While Keeping the Horizontal Vertical Ratio" May 1, 1991, IBM Technical Disclosure Bulletin, US, pp. 225-228, XP000121649, ISSN: 0018-8689.

Hoppe, Hughes; Association for Computing Machinery: "Progressive Meshes", Computer Graphics Proceedings 1996 (SIGGRAPH), New Orleans, LA, Aug. 4-9, 1996; pp. 99-108, XP000682726.

Detailed View, Products & Services, printed from http://www.sun.com/jsp_utils/ScreenShotPopup.jsp?title=Rotate%20Window&base=/software/products/p... printed on Feb. 23, 2005, 6 pages.

Figurnov, VA., "IBM PC for a User," Moscow: Infa-M. 1997. 14 pp.

International Search Report with Written Opinion dated Mar. 31, 2008.

"Office Action mailed Dec. 12, 2007 in U.S. Appl. No. 10/691,442, 12 pages."

"Office Action mailed Jun. 4, 2008 in U.S. Appl. No. 10/691,442, 12 pages."

"Office Action mailed Aug. 25, 2009 in U.S. Appl. No. 10/691,442, 12 pages."

"Office Action mailed Jan. 28, 2010 in U.S. Appl. No. 10/691,442, 11 pages."

"Office Action mailed Apr. 8, 2008 in U.S. Appl. No. 10/691,450, 87 pages."

"Office Action mailed Mar. 12, 2009 in U.S. Appl. No. 10/691,450, 40 pages."

"Office Action mailed Nov. 18, 2009 in U.S. Appl. No. 10/691,450, 49 pages."

"Office action mailed Apr. 9, 2010 in U.S. Appl. No. 10/691,450, 57 pages."

* cited by examiner

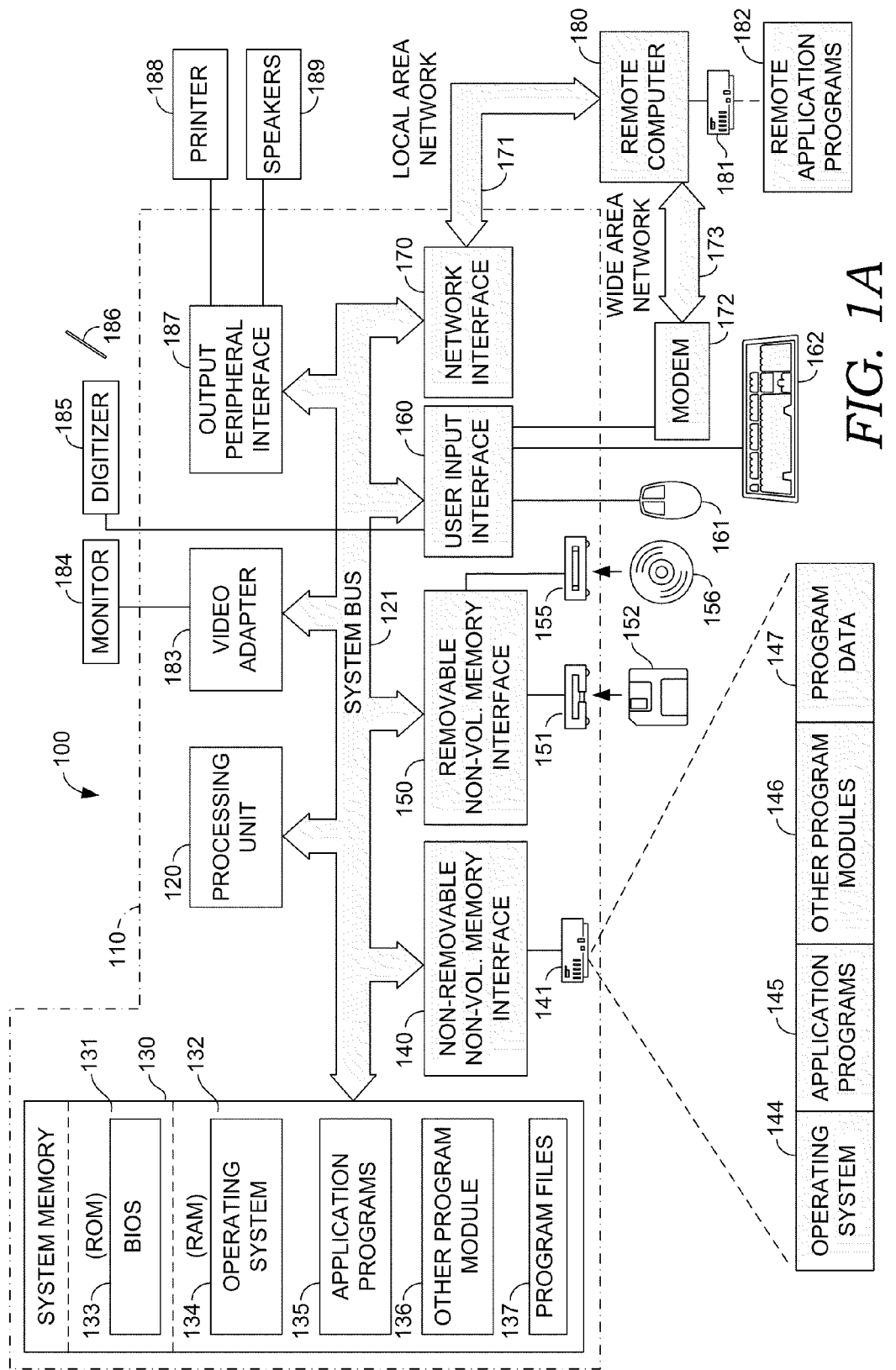

COMPOSITING DESKTOP WINDOW MANAGER

PRIORITY

This application claims priority from and is a divisional of U.S. Pat. No. 7,839,419, U.S. application Ser. No. 10/691,450, filed Oct. 23, 2003, and entitled "COMPOSITING DESKTOP WINDOW MANAGER."

FIELD OF THE INVENTION

The invention relates generally to computer graphics and computer operating systems. More specifically, the invention provides a 3D compositing desktop window manager, with intrinsic support for composition-agnostic legacy applications, for managing and rendering the desktop onto a single or multiple computer displays for an operating system.

BACKGROUND OF THE INVENTION

Computer operating systems typically have a shell that provides a graphical user interface (GUI) to an end-user. The shell consists of one or a combination of software components that provide direct communication between the user and the operating system. The graphical user interface typically provides a graphical icon-oriented and/or menu driven environment for the user to interact with the operating system, and is often based on a desktop metaphor. More specifically, the graphical user interface is designed to model the real world activity of working at a desk. The desktop environment typically occupies the entire surface of a single display device, or may span multiple display devices, and hosts subordinate user interface objects such as icons, menus, cursors and windows.

Among the types of rendered objects hosted by the desktop environment are visually delineated areas of the screen known as windows. A window is typically dedicated to a unique user activity, and is created and managed by either a third party software application or a system application. Each window behaves and displays its content independently as if it were a virtual display device under control of its particular application program. Windows can typically be interactively resized, moved around the display, and arranged in stacked order so as to fully or partially overlap one another. In some windowing environments, a window can assume discreet visual or behavioral states, such as minimized in size to an icon or maximized in size to occupy the entire display surface. The collection of desktop windows are commonly assigned a top to bottom order in which they are displayed, known in the art as the Z-order, whereby any window overlies all other windows lower than itself with respect to Z-order occupying the same projected position on the screen. A single, selected window has the "focus" at any given time, and is receptive to the user's input. The user can direct input focus to another window by clicking the window with a mouse or other pointer device, or by employing a system-defined keyboard shortcut or key combination. This allows the user to work efficiently with multiple application programs, files and documents in a manner similar to the real world scenario of managing paper documents and other items which can be arbitrarily stacked or arranged on a physical desktop.

A drawback to many prior graphical user interface desktop implementations is their limited capacity to present visually rich content or exploit enhancements in graphical rendering technology. Such enhancements include real-time rendering of physically modeled (lit, shaded, textured, transparent, reflecting, and refracting) two and three-dimensional content and smooth, high-performance animations. In contrast to the limited services available for utilizing graphical rendering enhancements on the desktop; visually rich content is possible within certain application programs running windowed or full screen within the graphical user interfaces of Windows® brand operating systems and like operating system shells. The types of application programs that present such content are video games with real time 3D animation and effects, advanced graphical authoring tools such as ray tracers and advanced 2D and 3D publishing applications. Since the visual output of these programs is either restricted to the content area of its application window(s) or rendered full-screen to the exclusion of other windows and the desktop itself, the rich graphical output of the application program in no way contributes to the presentation of the desktop environment.

Computer operating systems employ a software layer responsible for managing user interface objects such as icons, menus, cursors, windows and desktops; arbitrating events from input devices such as the mouse and keyboard; and providing user interface services to software applications. This software layer may be referred to as the Desktop Window Manager (DWM). The rendering logic, input event routing, and application programming interfaces (APIs) of the Desktop Window Manager (DWM) collectively embody user interface policy, which in turn defines the overall user experience of the operating system. A primary reason for the lack of rich, visual desktops up to the present has been the methods with which DWMs manage and render the desktop. Prior DWM implementations employ an "invalidation" model for rendering the desktop that evolved primarily from the need to conserve video and system memory resources as well as CPU and GPU bandwidth.

In the invalidation model, when a window is resized or moved, or when an application wishes to redraw all or part of a window, the affected portion of the display is "invalidated". The DWM internally invalidates areas affected by a window size or move, whereas an application attempting a redraw all or a portion of its own window instructs the operating system, via an API, to invalidate the specified area of its window. In either case, the DWM processes the invalidation request by determining the subset of the requested region that is in actual need of an on-screen update. The DWM typically accomplishes this by consulting a maintained list of intersecting regions associated with the target window, other windows overlying the target, clipping regions associated with the affected windows, and the visible boundaries of the display. The DWM subsequently sends each affected application a paint message specifying the region in need of an update in a proscribed top-to-bottom order. Applications can choose to either honor or ignore the specified region. Any painting performed by an application outside the local update region is automatically clipped by the DWM using services provided by a lower level graphical rendering engine such as the Graphics Device Interface (GDI).

An advantage of the invalidation-messaging model is conservation of display memory. That is, an invalidation based DWM only needs to maintain enough buffer memory to draw a single desktop, without "remembering" what might be underneath presently displayed content. However, because windows on the desktop are rendered in a top-down order, features such as non-rectangular windows and rich 2D animations via GDI require CPU intensive calculations involving complex regions and/or extensive sampling of the display surface (thereby limiting the potential for graphics hardware-based acceleration), whereas other features such as transparency, shadows, 3D graphics and advanced lighting effects are extremely difficult and very resource intensive.

By way of example, the Microsoft Windows® XP window manager, historically known as USER, has served as the dominant component of the graphical user interface subsystem (now known as Win32) since the advent of the Windows® brand operating system. USER employs the 2-dimensional Graphics Device Interface (GDI) graphic rendering engine to render the display. GDI is the other major subcomponent of Win32, and is based on rendering technology present in the original Windows® brand operating system. USER renders each window to the display using an invalidation-messaging model in concert with GDI clipping regions and 2D drawing primitives. A primary activity of USER in rendering the desktop involves the identification of regions of the display in need of visual update, and informing applications of the need and location to draw, as per the invalidation model of desktop rendering.

The next development in desktop rendering is a bottom-to-top rendering approach referred to as desktop compositing. In a compositing DWM, or CDWM, the desktop is drawn from the bottom layer up to the top layer. That is, the desktop background is drawn first, followed by icons, folders, and content sitting directly on the desktop, followed by the folder(s) up one level, and so forth. By rendering the desktop from the bottom up, each iterative layer can base its content on the layer below it. However, desktop compositing is a memory intensive process because the CDWM maintains in memory a copy of each item drawn to the desktop. Prior to recent market changes and manufacturing techniques that have made advanced video hardware and computer memory far more affordable, only commercial, expensive, high-end computing systems have been able to implement compositing engines, such as for preparing special effects for movies.

The evolution of mid- and lower-end computer video hardware has been driven in large part by the graphical services available in popular operating systems. However, the graphical services available in popular operating systems have not significantly advanced for a variety of reasons, including the need to maintain compatibility with older application software and the limited capabilities of the affordable range of video hardware. More recently, however, real-time 3D computer games have overtaken operating systems as the primary market incentive for evolving retail video hardware, which has in a short time attained an exceptional level of sophistication. Real time, hardware-based 3D acceleration is now available to consumers at reasonable cost. Thus, graphics hardware features once considered highly advanced, such as accelerated texture and lighting algorithms, 3D transformations and the ability to directly program the GPU are readily available. At present, generally only game software and highly specialized graphics applications actively exploit such features, and in order to do so they must bypass the legacy Win32 window manager (USER) and GDI.

Another obstacle in implementing a compositing desktop model is that legacy applications written for use with an invalidation model DWM will not function property in a compositing environment. This is because the core rendering logic of the legacy application is based on the operating system's invalidation-model DWM APIs. That is, rather than render window content in direct response to user interaction or changes in internal state, the legacy application will draw only upon receiving of a paint message generated either by the operating system or its own invalidation request. The most difficult remedy consists of devising a means by with the compositing DWM surrogates the legacy GUI platform on behalf of the application. The simpler alternatives consist of excluding the application from the composited desktop environment (an approach known in the art as "sand boxing"), or simply abandoning legacy application compatibility altogether.

Thus, it would be an advancement in the art to provide a rich, full featured operating system that renders a desktop using a compositing model, and to provide a desktop window manager that can take advantage of advanced graphics hardware. It would be a further advancement in the art to provide a desktop that uses advanced textures, lighting, and 3D transformations, yet supports legacy applications originally written for use in an invalidation-modeled desktop manager.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a composited desktop providing advanced graphics and rendering capabilities.

A first illustrative aspect of the invention provides software and a computer implemented method for rendering a desktop window in an operating system where, when a compositing desktop window manager (CDWM) manages an application-rendered memory surface comprising window content, the CDWM uses this pre-rendered surface to display the content along with that of other windows on the composited display. Specifically, the CDWM uses the redirected display surface for a window, or a portion thereof, as a texture applied to a 2D or 3D mesh primitive, which is in turn forwarded to the low-level graphics engine for rendering. This illustration includes the rendering of a 3D window frame backing the application-generated content portion of the window. The composited window frame consists of separate texture(s) mapped to a separate, resizable 3D mesh primitive, which is forwarded to the graphics rendering engine together with optional parameters to a pixel shader routine that the CDWM may have previously loaded into the graphics display device, to produce the appearance of a frosted glass slab backed by a drop shadow. Additional illustrative aspects of the invention provide for legacy support for applications designed for use with invalidation-model desktop window managers.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 1A illustrates an operating environment that may be used for one or more aspects of an illustrative embodiment of the invention.

DETAILED DESCRIPTION OF THE INVENTION

Figure 1B:
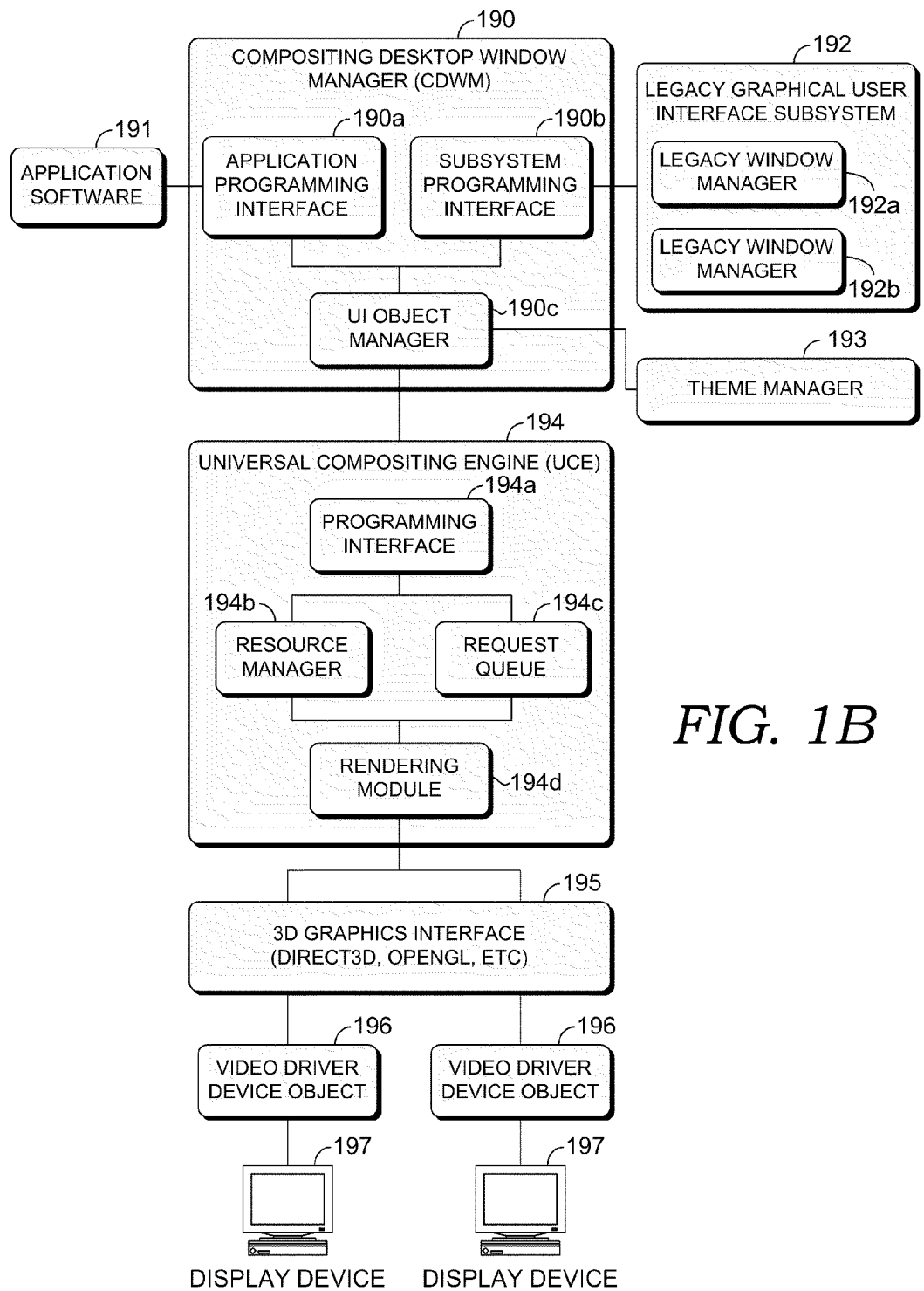
FIG. 1B illustrates the distribution of function and services among components in an illustrative embodiment of a composited desktop platform.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

The present invention provides a desktop window manager (DWM) that uses desktop compositing as its preferred rendering model. The inventive desktop window manager is referred to herein as a Compositing Desktop Window Manager (CDWM). The CDWM, together with the composition subsystem, referred to as the Unified Compositing Engine (UCE), provides 3D graphics and animation, shadows, transparency, advanced lighting techniques and other rich visual features on the desktop. The compositing rendering model used herein intrinsically eliminates the invalidation step in rendering and minimizes or eliminates the need to transmit paint and other notification messages because the system retains sufficient state information to render each window as required.

Illustrative Operating Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video interface 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

Illustrative Embodiments

The invention may use a compositing desktop window manager (CDWM) to draw and maintain the desktop display using a composited desktop model, i.e., a bottom-to-top rendering methodology. The CDWM may maintain content in a buffer memory area for future reference. The CDWM composes the desktop by drawing the desktop from the bottom up, beginning with the desktop background and proceeding through overlapping windows in reverse Z order. While composing the desktop, the CDWM may draw each window based in part on the content on top of which the window is being drawn, and based in part on other environmental factors (e.g., light source, reflective properties, etc.). For example, the CDWM may use the alpha channel of an ARGB format texture to provide transparency to a window, and may selectively emphasize portions of window content (e.g., the frame) based on a virtual light source.

The CDWM may reside as part of the operating system 134, 144, or may reside independently of the operating system, e.g., in other program modules 136, 146. In addition, the CDWM may rely upon a lower level graphics compositing subsystem, referred to herein as a Unified Compositing Engine (UCE), further described below and in co-pending application serial number 10/692,288, filed Oct. 23, 2003, entitled "System and Method for a Unified Composition Engine in a Graphics Processing System", herein incorporate by reference in its entirety for all purposes. In one illustrative embodiment the UCE is based on or uses Direct3D® and DirectX® technology by Microsoft Corporation of Redmond, Wash. In alternative embodiments other graphics compositing subsystems may be used, such as variations of the X Window platform based on the OpenGL® graphics engine by Silicon Graphics, Inc. of Mountain View, Calif., and the like. The UCE enables 3D graphics and animation, transparency, shadows, lighting effects, bump mapping, environment mapping, and other rich visual features on the desktop.

FIG. 1B illustrates a component architecture according to an illustrative embodiment of a desktop composition platform. A Compositing Desktop Window Manager (CDWM) 190 may include an Application Programming Interface 190*a* through which a composition-ware Application Software 191 obtains CDWM window and content creation and management services; a Subsystem Programming Interface 190*b*, through which the Legacy Windowing Graphics Subsystem 192 sends update notifications for changes affecting the redirected graphics output of individual windows (window graphical output redirection is described in more detail below); and a UI Object Manager 190*c* which maintains a Z-ordered repository for desktop UI objects such as windows and their associated content. The UI Object Manager may communicate with a Theme Manager 193 to retrieve resources, object behavioral attributes, and rendering metrics associated with an active desktop theme.

The Legacy Graphical User Interface Subsystem 192 may include a Legacy Window Manager 192*a* and Legacy Graphics Device Interface 192*b*. The Legacy Window Manager 192*a* provides invalidation-model windowing and desktop services for software applications developed prior to the advent of the CDWM. The Legacy Graphics Device Interface 192*b* provides 2D graphics services to both legacy applications as well as the Legacy Window Manager. The Legacy Graphics Device Interface, based on the invalidation model for rendering the desktop, may lack support for 3D, hardware-accelerated rendering primitives and transformations, and might not natively support per-pixel alpha channel transparency in bitmap copy and transfer operations. Together, the Legacy Window Manager 192*a* and Graphical Device Interface 192*b* continue to serve to decrease the cost of ownership for users who wish to upgrade their operating system without sacrificing the ability to run their favorite or critical software applications that use the invalidation model. In order to achieve seamless, side-by-side integration of legacy application windows with composition-aware application windows in a manner that imposes little or no discernable end-user penalties, there may be active participation of the Legacy Graphical User Interface Subsystem 192 in the compositing process. Indeed, the perceived platform environment for legacy applications preferably does not change in order to avoid compromising their robustness on the composited desktop, yet the fundamental manner in which legacy windows are rendered to the desktop will be fundamentally altered. The invention describes how this is achieved through the addition of a feature described herein as window graphical output redirection.

A Unified Compositing Engine (UCE) 194 may service rendering instructions and coalesce resources emitted from the CDWM via a Programming Interface 194*a*. In a broad sense, the role of the UCE relative to the CDWM is analogous to that of the Legacy Graphics Device Interface 192*b* relative to the Legacy Window Manager 192*a*. The UCE Programming Interface 194*a* provides the CDWM, and ultimately, applications, an abstract interface to a broad range of graphics services. Among these UCE services are resource management, encapsulation from multiple-display scenarios, and remote desktop support.

Graphics resource contention between CDWM write operations and rendering operations may be arbitrated by an internal Resource Manager 194*b*. Requests for resource updates and rendering services are placed on the UCE's Request Queue 194*c* by the Programming Interface subcomponent 194*a*. These requests may be processed asynchronously by the Rendering Module 194*d* at intervals coinciding with the refresh rate of the display devices installed on the system. Thus, the Rendering Module 194*d* of the UCE 194 may dequeue CDWM requests, access and manipulate resources stored in the Resource Manager 194*b* as necessary, and assemble and deliver display-specific rendering instructions to the 3D Graphics Interface 195.

Rendering the desktop to multiple displays requires abstraction of the differences in refresh rate, pixel format support, and device coordinate mapping among heterogenous display devices. The UCE may provide this abstraction.

The UCE may also be responsible for delivering graphics data over a network connection in remote desktop configurations. In order to efficiently remote the desktop of one particular system to another, resource contention should be avoided, performance optimizations should be enacted and security should be robust. These responsibilites may also rest with the UCE.

The 3D Graphics Interface 195 may include a low-level, immediate-mode (stateless) graphics service such as Direct3D®, OpenGL®, or the like. A purpose of the 3D Graphics Interface may be to provide an abstract interface over the features of the particular graphics hardware configuration. The 3D Graphics Interface may service a single display device; the UCE may parse and distribute the CDWM's rendering instructions among multiple graphics output devices 197 in a multiple-display system via multiple device drivers 196.

It should be noted that the component architecture depicted in FIG. 1B is that of an illustrative embodiment. The figure is intended to illustrate functions that the invention may include. These functions may be distributed among a fewer or greater number of software components than those represented in the figure, according to the capabilities of the platform and the desired feature set. For example, a system that lacks theme management might derive all stock resources from the system, likely as static resources managed by the CDWM itself, rather than from a separate theme manager. A platform that allows plugable window managers may replace the Application Programming Interface 190*a* in the CDWM with a Plugable Window Manager Interface in order to abstract the details of composited UI object and resource management. Another possible variation may eliminate the Subsystem Programming Interface 190*b* if legacy application compatibility is not required. The subcomponents of the UCE 194 depicted in FIG. 1B may be broken out into separate processes, folded into the CDWM itself or integrated into the 3D Graphics Interface. Thus a wide range of particular component designs are possible, each of which are capable of fulfilling either the entire range or a subset of the functions comprising the invention.

Figure 2:
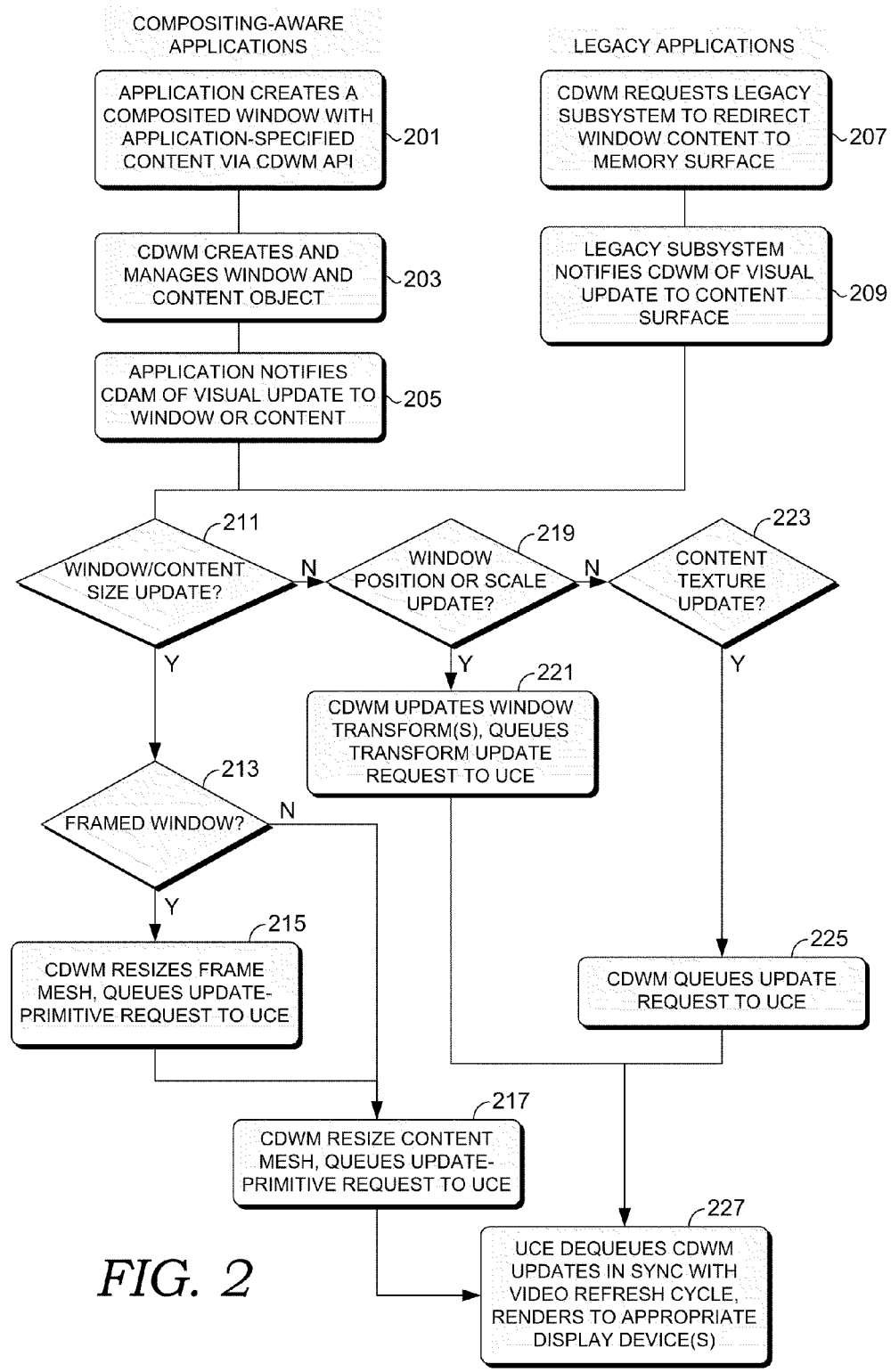
FIG. 2 illustrates a compositing method according to an illustrative aspect of the invention.

FIG. 2 illustrates a general method for performing desktop compositing according to an illustrative aspect of the invention. Steps 201 through 205 describe the interaction of a composition aware application using compositing desktop window manager (CDWM) APIs to create and manage a window and window content. Steps 207 and 209 depict the interaction between legacy, invalidation-model window manager applications and the CDWM to composite legacy window content.

In step 201, the compositing desktop window manager (CDWM) receives requests from a composition-aware application to (1) create a composited window and (2) attach a content object. The invention is not limited to a single content object per window; an application can dynamically create and attach to a window (as well as detach and destroy) any number of content objects via the CDWM API, further described below. A content object consists of a raster surface of specified size and pixel format to be used as a diffuse texture mapped to an application- or system-defined mesh, along with optional accessory resources such as additional textures (light map, specular map, bump/normal map, etc), lights and a pixel shader. The pixel format of the diffuse content texture may be any of the available formats supported by the video hardware installed on the system, but for the purposes of the current illustration, may be 32-bit ARGB. When requesting this format the application may be implicitly aware that the alpha (A) channel may be used to vary the transparency level of the content pixel, thus affording fine control over the amount of desktop background information modulating with the source pixel on final rendering. In step 203, the CDWM allocates a state block for the window to which it attaches a CDWM-implemented content object. The content object allocates the resources requested or attaches resources forwarded by the application, and then marshals these resources to the UCE to allow ready access on UCE update requests. In step 205, the application notifies the CDWM of an unsolicited change to the window or the window content. These changes can affect any window or content state, but for purpose of simplicity, the illustration depicts three common update requests: content size, window position or scale, or a change to the pixels of the content's diffuse texture.

The process of compositing a legacy window begins at desktop composition initialization, with the CDWM 190 delivering a request to the legacy windowing and graphics subsystem 192 to redirect the graphical output of each legacy window to a temporary memory location (step 207). Step 207 can be more generally described as placing the legacy window and graphics subsystem in "composition mode", in which the rendering of each individual window is redirected to a separate memory buffer. In an illustrative embodiment, the Legacy Graphical User Interface Subsystem 192 redirects the output of the graphics instructions involved in rendering the window to a bitmapped memory surface associated with the window. However, the invention encompasses the ability to retain the native drawing instructions and associated parameters, and executing these instructions in the UCE during the process of compositing the next video frame for a target display device. These redirection buffers (surfaces or drawing instruction blocks) may be managed by either the CDWM or the legacy window manager 192a, but the for the purpose of this illustration, surface resource management is centralized in the CDWM. Each redirection buffer either constitutes or is used to generate a diffuse content texture resource for the window. The legacy window manager 192a need not invoke the CDWM window and content creation APIs; the legacy subsystem-CDWM communication channel for notifications is distinct from that of the application interface, and the CDWM derives composited window attributes (frame and border style, caption, etc) and state (hidden/shown, minimized/maximized, etc) from existing legacy window properties. In step 209, the legacy window manager 192a informs the CDWM 190 of any change affecting the redirected window content texture that may necessitate a visual update.

In steps 211, 219 and 223, the CDWM 190 discriminates from among size, position/scale and pixel-level texture update requests, and acts accordingly. On a size update (step 211), the CDWM first determines whether a frame is associated with the target window (step 213). If a frame is associated with the window (step 215), the CDWM determines the appropriate size and orientation of the frame primitive based on a two- or three-dimensional extent explicitly provided by a composition-aware application, or on a combination of legacy and CDWM window metrics and the updated dimensions of the redirected legacy surface. When the frame size has been determined, the CDWM makes the appropriate changes to the position information in the vertices in the frame mesh, and forwards the vertex data buffer to the UCE. The UCE places the mesh update directive and the new vertex information on a queue for asynchronous processing. If the window does not have a frame, step 215 may be bypassed. In the case of either framed or frameless windows, size changes affecting the content area may cause the CDWM to resize the content mesh and queue the appropriate mesh update request and data to the UCE (step 217).

On a position (including rotation) or scale update (step 219), the CDWM determines the new transformation parameters and queues a transform resource update request along with the data to the UCE for asynchronous processing (step 221). The resource minimally consists of a four by four transformation matrix, but may contain additional data to support filtered transforms.

In step 223, the CDWM receives an update request involving a change to the pixel data of the diffuse content texture, i.e., the application has updated its content within its window. In step 225, the CDWM services the request by queuing the new pixel information to the UCE for asynchronous processing.

It will be appreciated by those of skill in the art that additional update requests may be supported in addition to those depicted in FIG. 2. For example, a change to the window icon or caption text may also necessitate a redraw of the CDWM-managed icon or caption content object, respectively, associated with the window. Window input focus may be reflected in the appearance of the frame, and thus in the case of a legacy window, the legacy window manager may deliver an input focus change update to the CDWM who re-renders the frame and possibly other content accordingly.

In step 227, the UCE processes incoming composition and resource updates from the CDWM, and at intervals synchronized with the video refresh rates of each active video graphics adapter participating in the composition of the desktop, re-renders the desktop (or the appropriate portion thereof in a multiple-display configuration) to a display-sized backing buffer. This is accomplished using the immediate-mode rendering services provided by a 3D graphics engine (such as Microsoft Direct3D®), which in turn transfers the desktop to a primary display surface.

In order to draw the window in 3D, the CDWM may define the window anatomy using various components, include a base content object and one or more child content objects. The base content object defines the window frame, or border, and consists of a base geometry, base extent, base material properties and base content margins. The base and child content objects may each be entirely defined and managed by the system or in the case of custom content elements, may be managed by the application. Content objects are discussed in more detail below.

Figure 3:
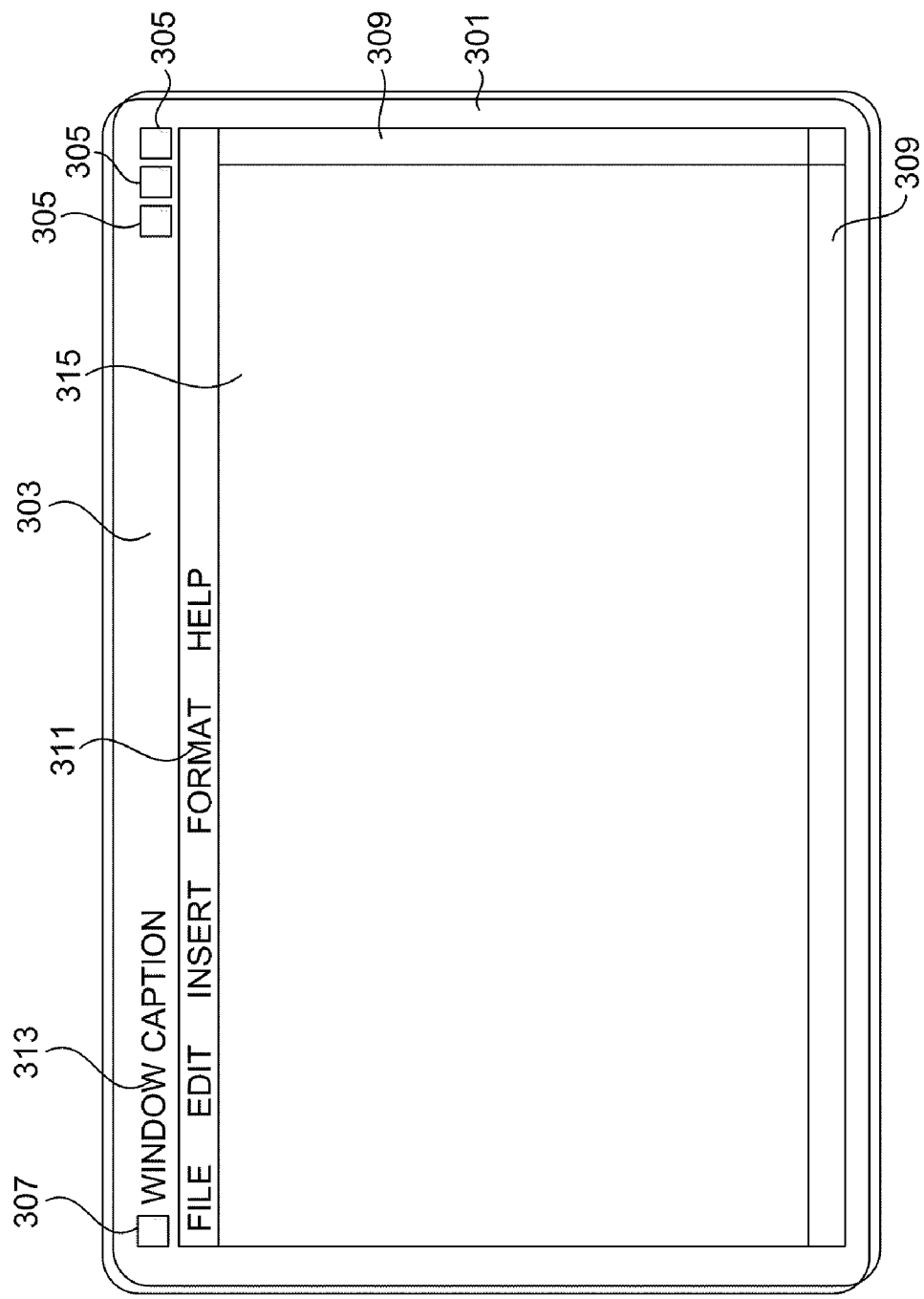
FIG. 3 illustrates a window according to an illustrative aspect of the invention.

FIG. 3 illustrates an application window according to an illustrative aspect of the invention. Application window 301 may include various regions and components. The frame or base content 303 of the window 301 may host child content including buttons 305 (e.g., used to restore, maximize, minimize, close the window, etc.), an indicative icon 307, scrollbars 309, menu bar 311, and window caption text 313. A primary content object area 315 may be derived from the redirection buffer obtained from the Legacy Window and Graphical User Interface Subsystem, or be created and attached to the standard base content and rendered by a composition-aware owning application. Those of skill in the art will appreciate that FIG. 3 is merely illustrative of basic window elements, and that additional or different window elements may additionally or alternatively be used. In addition, window frame elements may alternatively be provided by an application, e.g., to provide a distinct look and feel to an application program. An example would be where an application program provides the scroll bar elements as custom child content objects so that they manifest an appearance and behavior peculiar to the application program. Moreover, an application may elect to remove or reposition one or more of the stock frame elements using the CDWM API. An application need not be limited to a single primary content area, a restriction prevalent in the prior art.

The CDWM may support multiple application-created and rendered content areas, associated with a single window. In order to provide applications the capability to provide a more unique user experience, in one or more embodiments of the invention the CDWM provides flexibility in the manner in which a window may be drawn. That is, the CDWM may allow an application to alter the default anatomy of a window by allowing applications to define multiple custom content objects, each having an arbitrary shape, instead of limiting each application to a single, rectangular client content area.

Thus, each CDWM window may be comprised of a base content object (i.e., the frame) and a collection of one or more child content objects. Each content object may be defined by a unique set of content attributes, and can be configured to optionally receive keyboard and mouse events. The CDWM maps mouse hit-test points relative to application-defined, content-local, 3D coordinates, and delivers mouse event notifications to the application. Content objects may be managed entirely by the system, or in the case of custom content elements, may be managed by the application. Examples of system-managed content objects include the application indicative icon, frame buttons (e.g., minimize, restore, close), caption text, and certain menu bars and scroll bars. Application-managed content objects include those content objects(s) to which the application renders its primary visual output, e.g., text by a word processor, numeric grid by a spreadsheet application, or images by a photo editing application.

The content texture may be a bitmap managed by the system, or in the case of custom content, the application. The content texture may be mapped linearly to the content geometry in a single repeat. The aspect ratio may be determined by the content geometry, and texture coordinates may be exposed in the content geometry. Magnification of content may be controlled with a scaling transform that affects the mapping of the content texture to its geometry. The CDWM may provide a default interactive mechanism by which the user can adjust the zoom factor, such as a system-provided menu option, slider control, and/or mouse and keyboard combinations.

Prior to each re-rendering, a content surface whose diffuse texture is in a format supporting per-pixel alpha, may be initialized by the system to zero alpha at the discretion of the application (or the system in the case of a stock content object). Therefore the underlying base content object may be displayed in unpainted areas of the content surface. This enhances both the programming model and user experience because applications are not required to erase the content surface before rendering, and the user is spared flicker and stale or unpainted areas in the window.

In some embodiments, certain content objects, particularly those to which the application renders its primary graphical output, may have no material properties associated with them because it would be undesirable to have the content interact with light or the environment in a manner distracting to the user or otherwise interfering with the user's activities. The visual appearance of a content object may be determined solely by its texture, geometry and perhaps the per-vertex or per-pixel alpha value in such embodiments.

Figure 6:
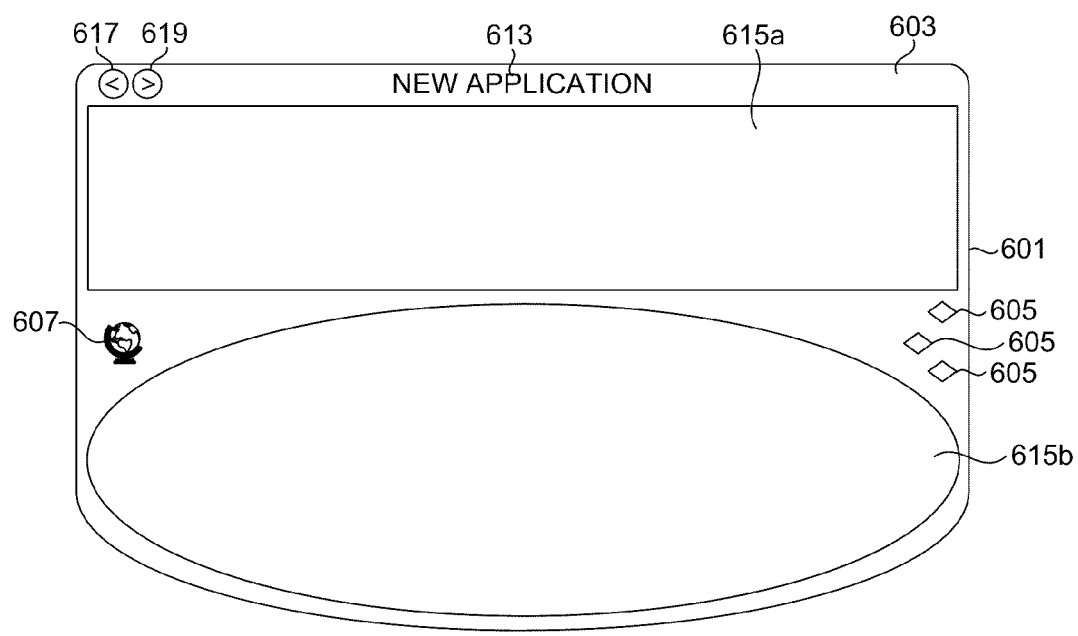
FIG. 6 illustrates a window with a dynamic window anatomy.

FIG. 6 illustrates an example of a window 601 with a dynamic non-standard anatomy as described herein. Window 601 has a base frame object 603 of a non-standard shape (i.e., non-rectangular), frame button objects 605 of non-standard shape (not rectangular) positioned in a non-standard location (other than the top right corner of the window), system-provided indicative frame icon object 607 in a non-standard position (other than the top left corner of the window), and frame window caption object 613 also in a non-standard position (not left justified in the top of the frame). In FIG. 6, the application associated with the window has defined two primary content object areas 615a and 615b. Primary content object area 615a is of regular (i.e., rectangular) shape, whereas primary content object area 615b is of an irregular, non-rectangular shape. Window 601 may also include application-defined frame button objects 617 and 619 providing back and forward navigation control, respectively, e.g., in a browsing context.

The CDWM may render the base portion of the application window 301 as a three-dimensional (3D) object. A 3D mesh primitive may be used to define the window object's shape (base geometry), a primary diffuse texture may be mapped to the 3D geometry of the mesh, and optional material properties which may include lighting, shading, refraction, blur and other special effect parameters and resources, including ancillary textures, applied during the rendering process. Ancillary textures may be used as resources for graphical effects well known in the art in order to provide "live," physically modeled interaction with light sources, cursors, and other UI objects in the desktop environment. Thus, textures may serve as the source of per-pixel 3D normal information (normal/bump mapping), light masks (ambient, diffuse and specular light filters), reflection sources (e.g. reflection of the cursor when hovered over the window), static environment maps, and the like.

The vertex format of the base geometry may optionally include a 32-bit diffuse color component in ARGB format and texture coordinate pairs $\{tu_n, tv_n\}$ for mapping up to n textures to the mesh geometry, as described above. As is well established in the art, each integer increment of tu and tv may define a repeat of the texture in the respective dimension. For example, values range from $\{0.0, 0.0\}$ (texture left, top) to $\{1.0, 1.0\}$ (texture right, bottom) represent a single repeat over the entire mesh, whereas $\{0.0, 0.0\}$ to $\{6.0, 4.0\}$ define six repetitions in the x-dimension and four repetitions in the y-dimension.

A content extent may be defined as a pair of three-dimensional points defining a bounding extent $\{x_{left}, y_{top}, z_{front}, x_{right}, y_{bottom}, z_{back}\}$, or the coordinates of the smallest box that contain the base geometry. This is analogous to the 2D bounding window rectangle $\{x_{left}, y_{top}, x_{right}, y_{bottom}\}$. The triplet $\{x_{left}\text{-}x_{right}, y_{top}\text{-}y_{bottom}, z_{back}\text{-}z_{back}\}$ defines the width, height and depth of the content's extent. The extent is calculated and managed by the system and represents the size and local position of the content.

If the window object is resizable, manipulating the base content's extent is the means by which the CDWM may resize the window. In order to preserve edge and corner contours, the position of each vertex in a resizable mesh might not simply be scaled to the new extent. To enable fine control over mesh resizing, a predefined vertex position filter function along with applicable parameters may be specified by the application at window creation time, or selected by the CDWM as a default. The role of the vertex resizing filter function is to determine how each vertex in the target mesh behaves when its bounding extent is altered. Every filter function should determine for every member vertex the displacement direction and magnitude in each dimension (x, y, z).

The simplest filter function determines the direction, (positive or negative), and the magnitude (scaled relative to the new extent or offset by an amount equal to that of one of the six faces of the mesh's bounding box in a 3D space). How each vertex behaves in a resizing operation can be described on a per-vertex, per-dimension basis as a property associated with the vertex itself, or can be defined for the mesh as a whole in geometric terms. An example of the latter method is a pair of vectors $\{mx_{left}, my_{top}, mz_{front}, mx_{right}, my_{bottom}, mz_{back}\}$ defining six sizing margin planes, each associated with a face of the mesh bounding box, effectively dividing the volume of the bounding box into 27 cubic subregions. The sizing margin values may remain constant regardless of the size of the mesh, or may be calculated based on the initial size of the bounding box. In an arbitrary mesh resizing operation, vertices occurring in the upper, left, front cubic subregion (bounded by $\{x_{left}, y_{top}, z_{front}, mx_{left}, my_{top}, mz_{front}\}$) are offset by the same magnitude and direction as the upper-left-front corner of the bounding extent. Vertices occurring in the centermost cubic subregion (bounded by {mx$_{left}$, my$_{top}$, mz$_{front}$, mx$_{right}$, my$_{bottom}$, mz$_{back}$}) are scaled relative to the new extent of that subregion. Vertices occurring in the front, center cubic subregion are scaled relative to the new extent of that subregion in the x and y dimension, but are displaced by the same magnitude and in the same direction as the mesh's front Z bounding plane.

Figure 7:
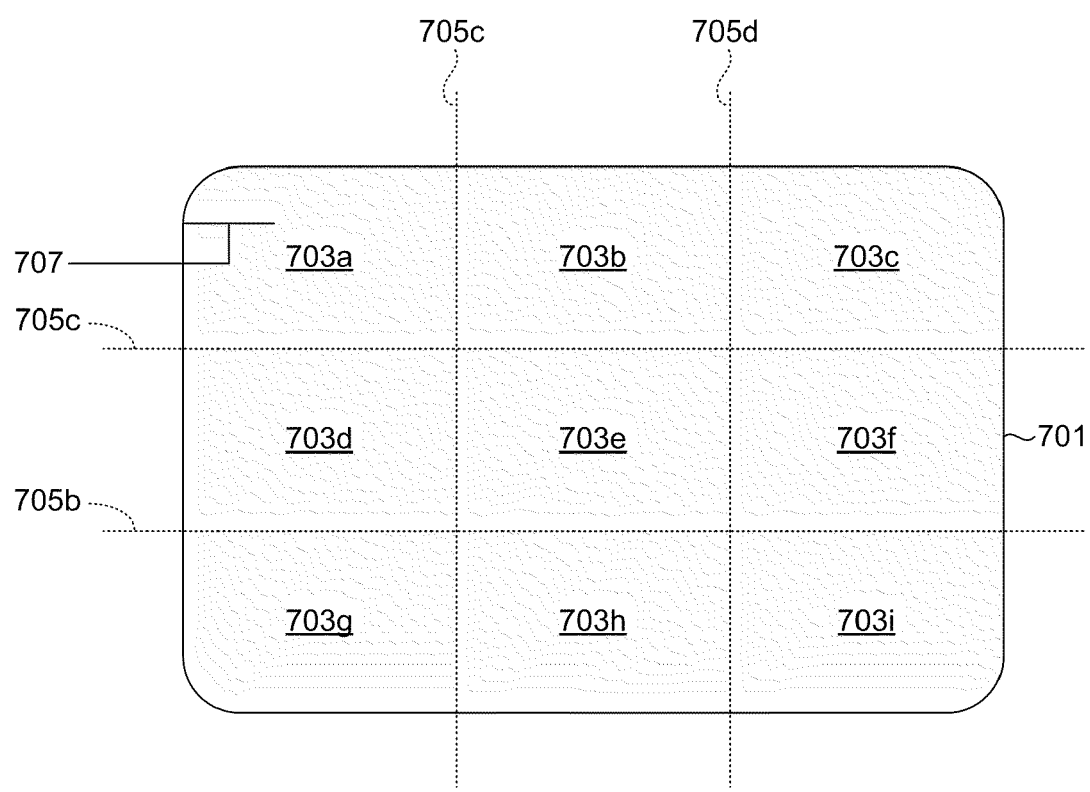
FIG. 7 illustrates regions used during mesh resizing.

To aid in understanding the above-described principle, FIG. 7 illustrates an example of a mesh resize operation in a 2-dimensional space. A window 701 has rounded corners with a corner radius 707. If a window resize operation merely scales the mesh on which the window is based, the corner radius would scale with the mesh. However, if the corner radius is scaled, the radius of the rounded corners may become too large or small and detract from the user experience and detract from the usability of the user interface. Thus, as the window 701 is resized, the corner radius preferably does not change. In order to prevent the corner radius from scaling, the mesh may be divided into three segments per dimension (x, y, z as applicable). Thus in the present example, the window is divided into 9 quadrants 703a-i. In a 3D space, the window may be divided into 27 regions. Each dimension may be equally divided or divided unequally, thus allowing for equally sized region or unequally sized regions. When regions are unequally sized, regions bounded by the bounding box may be made as small as necessary to encompass material that should not be scaled.

During a window resize operation, quadrants are offset in each dimension in which the quadrant is bounded by the bounding box, and scaled in each dimension in which the quadrant is bounded by a region divider 705a-d. For example, regions 703a, 703c, 703g, and 703i are bounded by the bounding box on at least one side in both the X and Y dimensions, so mesh vertices in regions 703a, 703c, 703g, and 703i retain the same offset from the bounding box as the window is resized. Regions 703b and 703h are bounded by the bounding box on at least one side in the Y (vertical) dimension, but bounded only by region dividers 705 in the X (horizontal) dimension. Thus, mesh vertices in regions 703b and 703h will retain their offsets in the Y dimensions, but be scaled in the X dimension. Regions 703d and 703f are bounded by the bounding box on at least one side in the X (horizontal) dimension, but bounded only by region dividers 705 in the Y (vertical) dimension. Thus, mesh vertices in regions 703d and 703f will retain their offsets in the X dimension, but be scaled in the Y dimension. Region 703e is bounded by dividing lines 705 in both the X and Y dominions, so mesh vertices falling within region 703e will be scaled in both the X and Y dimensions. One of skill in the art will recognize the extension of this algorithm to 3 dimensions by including a Z dimension as described in the preceding paragraphs.

Another variation of a mesh resizing filter function may interpret hand-authored vertex metadata rather than rely on a global geometric construct such as sizing margins to determine whether the vertex position scales or offsets in any direction. Such a function might be used to preserve complex surface topology such as ridges and troughs during a mesh resize. Another variation of a mesh resizing filter function may allow vertices to be displaced in each dimension in a linear or nonlinear manner, with discrimination bits and function coefficients stored as per-vertex metadata. Such a function enables effects such as linear or non-linear, localized or generalized bulging or collapsing concomitant with mesh resize.

The base content margins define the boundaries to which child content is constrained. Content margins may be three-dimensional boundaries defined in the same manner as sizing margins. However, unlike sizing margins, content margins may scale linearly with window scale, and might not influence mesh resizing.

Local and desktop-global resources and parameters, as specified according to the values of abstract material properties, in combination with pixel shaders, comprise the data and mechanism by which the CDWM may implement the rendering of physical modeled desktop content.

High-level content material properties define the manner in which the content interacts with light and the surrounding environment. The rendering of complex materials such as frosted glass may use techniques not natively supported in video hardware. As a result, the CDWM implements the material properties using one of a small number of predefined pixel shaders. A pixel shader is a small routine loaded into the display hardware that manipulates the values of pixels prior to display based on a pre-defined set of resources, including but not limited to light sources, textures, and vertices in a mesh primitive, as well as parameters such as transforms and metrics. The CDWM may select from among its collection of predefined pixel shaders the appropriate shader to render a particular set of object material properties, which include ambient color (intensity and transparency), diffuse color (intensity and transparency), specular color (intensity and transparency), reflection scalar, refraction index, diffuse texture, and bump texture, each of which is described further below. Desktop-global properties may be used to define global environment properties, such as eye position, global light source(s), environment maps, and the like. The resources and parameters that define these desktop-global properties may be forwarded together with the base window material properties to the 3D Graphics Interface as parameters to the active pixel shader immediately prior to rendering the window.

Ambient color simulates light hitting the surface of the object from all directions. As a material property applicable to any CDWM-managed UI content object, ambient intensity determines the relative amount of ambient light contacting the surface of the object, and a 32-bit ARGB value may be used to specify the ambient color and transparency. In one illustrative embodiment, ambient intensity may range from 0.0 (zero ambient light, giving a uniformly black appearance) to 1.0 (maximum intensity of the specified color distributed uniformly over the object). The effect of ambient intensity with a white ambient color allows control over the general brightness of the object.

Diffusion intensity determines the amount of directional light scattered in all directions after contacting the object's surface. The light itself is provided either by one or more directional lights or the cubic light map. As a material property applicable to any CDWM-managed UI content object, diffuse color may be specified by a 32-bit ARGB value that dictates the color, where the alpha component dictates the transparency of the light reflected diffusely. The diffusion intensity value ranges from 0.0 (no light is reflected diffusely, giving the object a uniformly black appearance) to 1.0 (all light is reflected diffusely, giving the object a shaded appearance according to the diffusion color value). Lit surfaces will appear more realistically modeled as the sum of the ambient and diffusion intensity values approaches 1.0.

Specular intensity controls how much light is reflected off the object's surface directly back at the viewer, and specular color may be specified as an ARGB color of the object. The light source itself may be in the form of either one or more directional lights or a cubic light map. As a material property applicable to any CDWM-managed UI content object, high specular intensity values may be used to model a shiny surface with sharp highlights, whereas low values may be used to model a matte surface with faint or absent highlights. The alpha component of the color determines the transparency of the specular highlights.

Reflectivity, like specularity, determines the amount of light that is reflected directly back at the viewer from the surface of the object. Reflection differs from specularity in that reflection applies to the entire environment, not just the light source. As a material property applicable to any CDWM-managed UI Content object, a reflectivity value of 0.0 produces no reflection of the environment in the surface, and a value of 1.0 produces mirror-like reflection of the environment in the surface. The environment may be modeled using a combination of the cubic environment map and the mouse cursor. Thus, the mouse cursor as well as static features of the environment may be reflected from the window surface to a degree controlled by the reflection intensity scalar.

The refraction index of each object determines the angle of transmission of light traveling through it. Snell's law, $n_1 \sin \theta_1 = n_2 \sin \theta_2$, may be used, where $n_1$ and $n_2$ are the refraction indices of mediums 1 and 2, and $\theta_1$ and $\theta_2$ are incident and transmission angles, respectively, of light relative to the surface normal. Therefore if medium 1 represents the desktop environment with an assigned refraction index of 1.0 (no refraction), and medium 2 is that of the window base object, the angle of refraction is determined as $\theta_{obj} = \sin^{-1}(\sin \theta_{env} / n_{obj})$. Known refraction indices for various media which may be simulated are shown below in Table 1.

TABLE 1

| Medium | Refraction Index |
|---|---|
| vacuum | 1.00 |
| ice | 1.31 |
| water | 1.33 |
| glass | Generally 1.50-1.75 |
| diamond | 2.42 |

Once the angle of refraction has been determined/computed, it may then be used to select the proper pixel from the background to render on the visible surface of the object following further processing associated with other material properties. Optimizations for the purpose of real time rendering of refraction may incorporate the Fresnel technique, a method appreciated by those of skill in the art.

Visual styles (themes) may be used to define CDWM visual and behavioral policy. Visual Styles generally refer to user-selectable themes that specify elaborate, hand-designed graphics and behavioral attributes applied to common user interface elements. Applications may optionally override some of these attributes, whereas others are selectively enforced by the system in the interest of consistency in the user interface. Visual attributes include the appearance of common window content such as the frame area (base content), non-client buttons, and other application independent elements. Behavioral attributes include window and desktop transition animations, the manner in which a window is interactively moved or resized with the mouse (e.g., snap, glue and stretch and constraint), and other application-independent behaviors. Visual and behavioral policy may be centralized in the CDWM rather than having that policy distributed throughout the software rendering pipeline, thus providing a more consistent end-user experience, and a simpler development environment.

Figure 5:
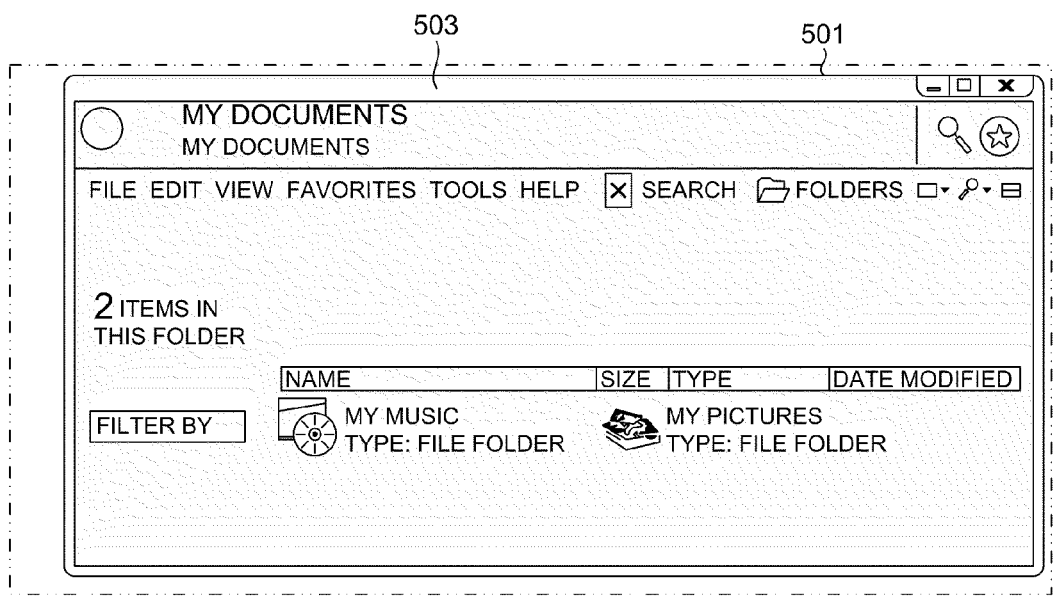
FIG. 5 illustrates a frosted glass framed window rendered according to an illustrative aspect of the invention.

According to an illustrative embodiment of the invention, the default (or custom) texture of a visual style may comprise an alpha level and/or a bitmap based on which each pixel is modified. For example, an alpha level may be used to modify a transparency level, as is known in the art. In addition, the texture may comprise a bitmap with which the client and/or non-client area, or a portion of the client and/or non-client area, may be pixel shaded. In one illustrative embodiment, for example, the bitmap may give the appearance of frosted glass. FIG. 5 illustrates a window 501 rendered with a frosted glass frame 503, where the refraction index may be specified to simulate glass when determining which pixel from the content behind window frame 503 should appear. By taking advantage of the graphics rendering engine's advanced texturing, lighting, and 3D capabilities, and using an appropriate bitmap, the CDWM can compose a window 501 with a frame 503 having a frosted glass appearance that reflects light from an optionally specified virtual light source within the 3D desktop environment, yet has an opaque client content area so that visual acuity of the client content is not diminished.

Desktop rendering models (invalidation versus compositing) each have a unique schema for interacting with application programs so that the application program's window(s) are maintained properly on the desktop. For example, in an invalidation model, the desktop rendering is dependent on the management and continuous updating of window "clipping regions." Clipping is the process by which rendering is limited to an appropriate area of a window. When one window is partially obscured by another, its clipping region corresponds to the inverse of the obscured area. If the underlying window paints its content, whether in response to a paint message or in an unsolicited manner, the invalidation model DWM ensures that its clipping region is applied to the output, thus ensuring that no painting will take place in the overlying window(s). If the overlying window is moved, or the underlying window is brought to the top of the Z-order, the clipping region of the underlying window is adjusted by the DWM accordingly before it sends the window a paint message to update any newly exposed content.

Invalidation model DWMs and compositing model DWMs thus rely on different information to draw the desktop. For example, in an invalidation model DWM, because the DWM does not store a copy of the entire surface of each window on the desktop, the DWM must communicate with an application to refresh content during resizing and redraws. Likewise, the application expects to not need to refresh its content unless asked to do so by the DWM (unless, of course, the content is updated as a result of user input). If the application does need to independently update its own content, it asks the DWM to invalidate a portion of its own window, expecting to receive from the DWM a paint request corresponding to the invalid region. Because in the case of the composited desktop sufficient information to draw each window in its entirety is retained by the CDWM, the CDWM need not send the window paint messages on events such as those described above. This in turn obviates the invalidation step; the application need simply to redraw all or a portion of itself as internal events dictate.

Due to these fundamental differences, each DWM and/or CDWM has a unique set of APIs through which application programs expect to communicate with the DWM to ensure that the window content is kept current. As a result, an application originally programmed for use with an invalidation model DWM, i.e. one that relies on paint messages to render its content, will not necessarily work with a compositing model CDWM. Thus, with reference to FIG. 4, the CDWM may provide support for applications originally developed for use in an invalidation model DWM. These applications may be referred to herein as legacy applications, and the backwards-compatible support may be referred to herein as legacy support. Legacy APIs refer to APIs for use with a prior version of the operating system that used an invalidation model DWM with which the legacy application is compatible. The legacy APIs 192*b* (FIG. 1B) allow the application to communicate with the invalidation model DWM (legacy DWM) 192*a*. The legacy DWM may use a separate legacy API element to process various legacy notifications on behalf of the application to CDWM, to transfer relevant state information to the CDWM, and to translate between legacy and CDWM coordinate spaces for input and focus determinations. The legacy DWM may be modified to redirect data to the CDWM, as described below.

Figure 4:
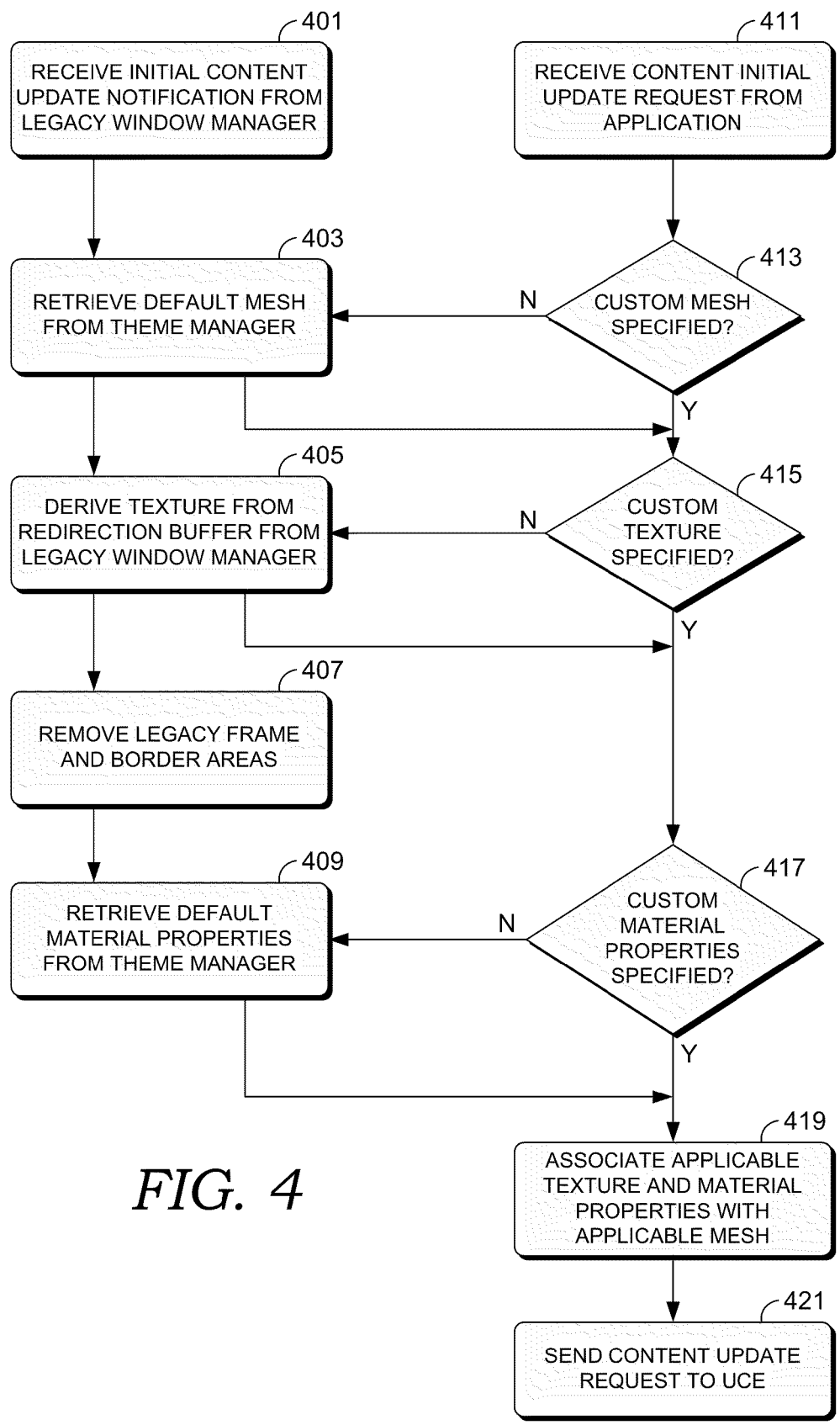
FIG. 4 illustrates a portion of a window compositing method according to an illustrative aspect of the invention.

FIG. 4 illustrates a portion of a window compositing method according to an illustrative aspect of the invention. Steps 401-409 represent the initial rendering of content associated with a legacy application window whose source rendering surface (or set if instructions required to generate the surface) is obtained from the Legacy Window Manager 192*a* (FIG. 1B). Steps 411-419 illustrate rendering of window content created by a composition-aware application program.

In step 401, the CDWM receives an initial update notification for the primary window content from the legacy window manager As a result of a legacy application calling legacy APIs 192*b* to draw a window on the desktop according to the invalidation model for which the application was designed. For example, Microsoft® Word® XP may call the legacy APIs so that the legacy DWM 192*a* draws text input by the user. In step 403 the CDWM retrieves the content's default mesh from the theme manager. In step 405 the CDWM retrieves (or generates) the redirection surface from the Legacy Window Manager. This surface may be used as the content's diffuse texture. In step 407, the CDWM ensures that only the desired areas of the legacy texture are retained, so that those containing the legacy window frame, border and/or caption or not rendered. One manner in which this can be accomplished expediently is by transforming the texture mapping coordinates of the mesh such that only the desired area is Mapped to the mesh's x and y bounding extents. In step 409, the CDWM retrieves default material properties for the content. The resources and parameters required to render the legacy content have now been collected.

In step 411 the CDWM receives information from an application program requiring the rendering of a content object associated with a window. The content may optionally be accompanied by a custom mesh, custom texture, and/or custom material properties. A custom mesh may be provided alone when the application program desires to have a non-standard shape for an existing content object. If the content object in question is the window base content, the custom mesh will redefine the shape of the window. A custom texture and/or custom material properties may be provided alone when the application program desires to impart a non-standard appearance (i.e., other than that specified by the active theme) to a system-defined content object. If the content object in question is the window base content, the custom texture and/or material properties redefine the appearance of the window without modifying its shape. More commonly, the application creates a content object from scratch and specifies its mesh (which may be selected from a set of predefined system meshes), texture and material properties (which may be selected from a set of predefined system material properties) at creation time.

In step 413 the CDWM determines whether a custom content mesh was specified and, if not, retrieves a default mesh from the theme manager (step 403). In step 415 the CDWM determines whether a custom texture was specified and, if not, retrieves a default texture from the theme manager. In step 417, the CDWM determines whether custom material properties were specified by the application and, if not, retrieves a default set of material properties from the theme manager. The resources and parameters required to render the custom content have now been collected.

In step 419 the CDWM assembles a rendering instruction block via the UCE Programming Interface to render the content, with references to the appropriate mesh, texture and material properties. The rendering instruction block is queued for execution by the UCE. The instruction block is executed by the UCE Rendering Model on expiration of the pending refresh interval of the target device(s).

By providing legacy support, the operating system in which the CDWM and legacy DWM are integrated inherently has the capability to render the desktop using the invalidation DWM (legacy DWM 192*a*) or the compositing DWM (CDWM 190). That is, the invalidation model DWM is supported by the operating system in addition to the composition model in order to provide legacy support. Thus, in systems that do not have the video hardware necessary to efficiently perform the processor intensive calculations required for desktop compositing (e.g., in systems with low video memory, or with no 3D acceleration hardware) the CDWM and/or the operating system may allow a user to select whether the compositing or legacy drawing mode should be used. The selection may be made automatically or manually. For example, the selection may be made via manual user control, in accordance with the drawing mode defined by an activated visual style (theme) selected by the user. The selection may alternatively or also be based on power-conservation conditions. For example, when a portable device is disconnected from an AC power source and switches to battery power, the operating system may enforce legacy drawing mode because it is the video graphics processing unit (GPU) is less active and thus consumes less power.

Using the methods and systems described above, an operating system may provide a physically modeled graphical user interface that uses advanced 3D graphics capabilities. Window frames may take on not only the appearance, but also the characteristics, of frosted glass or some other complex material that provides a simulated surface appearance having at least some transparency combined with at least some distortion of the content visible as a result of the transparency, resulting in a translucent effect. That is, not only does the present invention have the capability to make a window frame or border look like frosted glass, but the window frame also behaves like frosted glass in that it reflects content in the GUI environment, includes spectral highlights indicative of virtual light sources, simulates an index of refraction similar to glass such that content behind the "frosted glass" border is slightly offset accordingly, and a bitmap may be applied via one or more pixel shaders to provide distortion of underlying content.

Frosted glass or other glass-like physically modeled objects provide many advantages to a user of the graphical user interface. For example, the aesthetic appearance of the glass enhances the GUI and provides a rich user experience that makes a GUI of the present invention more desirable to end-users than GUIs of other operating systems by providing a light, open feeling to the user. At the same time, physically modeled frosted glass having true or near true characteristics of glass also provides functional advantages.

The frosted glass appearance aids the user to understand window layer order in a multi-window environment. Shading, reflection, and specular highlights create a stronger sense of depth and layers on the desktop, and help a user determine the Z order of various windows on the desktop. While some known systems apply uniform transparency to an entire window, a user might not readily perceive what content is within the window of interest and what content is behind the window. By varying this uniform, per-pixel transparency as a function of Z-order, it is possible to ameliorate the problem, but in an unnatural, non-intuitive manner. Rather, by incorporating into a pixel shader an adjustable blurring algorithm that samples multiple surrounding source pixels in the course of generating each destination pixel, and executing this shader in the process of rendering the window frame, the present invention models the light-scattering behavior arising from the material imperfections in real-world frosted glass. It is this physically modeled distortion of the background that allows the user to immediately distinguish between background and foreground content. And because the effect is cumulative, overlapping frosted glass window frames become progressively more distorted from foreground to background. Thus, the user can intuitively differentiate background content underlying multiple layers of frosted glass window frames.

Frosted glass also allows the use of thicker borders to ease user interaction with the GUI, for example, by making it easier for a user to grab a window border with a mouse to move or resize the window, yet not obscure content beneath the window (because the glass is transparent or translucent). Various frosted glass effects may be used to make it easier for a user to tell the difference for active versus inactive window states. In addition, frosted glass makes it easier for a user to read and/or view content on the screen, because the user can view more screen area at any given time (because the frosted glass is translucent or transparent), and the desktop appears less cluttered because glass is a non-obtrusive element on the display screen.

It will be appreciated by those of skill in the art that, while the figures depict a specific example of frosted glass, the invention is not so limited. The frosted glass appearance may be easily varied by applying a different bitmap and/or a different pixel shaper to the rendering of the appearance. In addition, applying different environment variables (e.g., differing the light source(s), which affects reflection and specular highlights) or changing virtual physical properties of the glass (e.g., index of refraction, reflection, etc.), will affect the appearance of the frosted glass as well. It will be appreciate that the present invention may also be used to simulate other textures and compounds, e.g., metals, plastics, paper, cotton, and other natural and synthetic materials.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computer implemented method for rendering a desktop window in a graphical user interface of an operating system shell, comprising:
    receiving application content to display in a window in the graphical user interface; and
    displaying at least a portion of the application content in an opaque content portion of the window, the window having a translucent frame portion, wherein the translucent frame portion of the window comprises a likeness of glass, wherein displaying further comprises:
        applying a texture to a mesh,
        receiving a user input to resize the window, wherein resizing the window further comprises:
            dividing the mesh into three regions per mesh dimension, for each region, maintaining offsets to mesh vertices in any dimension by which the region is bounded by a bounding box of the window, and scaling mesh vertices in any dimension by which the region is not bounded by the bounding box of the window, and
            determining by a vertex resizing filter function the displacement direction and magnitude in each dimension for every member vertex.

2. The computer implemented method of claim 1, wherein the translucent frame portion of the window comprises a likeness of frosted glass.

3. The computer-implemented method of claim 1, wherein the regions are equally sized.

4. The computer-implemented method of claim 1, wherein the regions are not equally sized.

5. The computer-implemented method of claim 1, wherein the regions bounded by the bounding box are as small as necessary to encompass material that should not be scaled.

6. A computer storage medium not a transitory propagating signal per se, the computer storage medium storing computer executable instructions that cause a computer to perform a method for rendering a desktop window in a graphical user interface of an operating system shell, comprising:
    receiving, at a compositing desktop window manager (CDWM), application content from advanced applications in a bottom-to-top order, to display the application content received in a bottom-to-top order in windows corresponding to the advanced applications in the graphical user interface;
    receiving, at a desktop window manager (DWM), application content from legacy applications in a top-to-bottom order to display the application content received in a top-to-bottom order in windows corresponding to the legacy application in the graphical user interface, wherein the DWM redirects the application content received to the CDWM;
    stripping out application content received from the legacy applications, wherein the legacy texture of the primary content is retained but legacy window frames, legacy borders, or legacy captions of the legacy application content are ignored;
    converting the stripped application content to a graphical representation; and
    displaying at least a portion of the application content in the windows, the windows having translucent frame portions, wherein displaying further comprises:
        the CDWM modeling the window by applying a texture to a mesh, receiving user input to resize the window, dividing the mesh into three regions per mesh dimension,
        for each region, maintaining offsets of mesh vertices in any dimension by which the region is bounded by a bounding box of the window, and scaling mesh vertices in any dimension by which the region is not bounded by the bounding box of the window, and
        determining by a vertex resizing filter function the displacement direction and magnitude in each dimension for every member vertex.

7. The computer storage medium of claim 6, wherein the displaying step comprises a pixel shader content on top of which the frame portion is rendered.

8. The computer storage medium of claim 6, wherein the translucent frame portion of the window comprises a likeness of glass.

9. The computer storage medium of claim 6, wherein the translucent frame portion of the window comprises a likeness of frosted glass.

10. The computer readable medium of claim 6, wherein the receiving step comprises receiving application content information originating from an instance of a legacy application program.

11. The computer readable medium of claim of claim 6 wherein the regions are equally sized.

12. The computer readable medium of claim of claim 6, wherein the regions are not equally sized.

13. The computer readable medium of claim 6, wherein the regions bounded by the bounding box are as small as necessary to encompass material that should not be scaled.

14. A computer implemented method for rendering a desktop window in a graphical user interface of an operating system shell, comprising:
  receiving application content to display in a window; and
  displaying at least a portion of the application content in a content portion of the window having a frame portion, wherein the displaying further comprises:
    rendering spectral highlights on the frame portion based on a virtual light source by a compositing desktop window manager configured to provide transparency, shadows, lighting effects, bump mapping, and environmental mapping via a pixel shader that manipulates pixels of the application content based on desktop-global properties and window-material properties,
  applying a texture to a mesh,
  receiving a user input to resize the window, wherein resizing the window further comprises:
    dividing the mesh into three regions per mesh dimension, for each region, maintaining offsets to mesh vertices in any dimension by which the region is bounded by a bounding box of the window, and scaling mesh vertices in any dimension by which the region is not bounded by the bounding box of the window, and
    determining, by a vertex resizing filter function, the displacement direction and magnitude in each dimension for every member vertex.

* * * * *